(12) United States Patent
Doi (10) Patent No.: US 9,975,462 B2
(45) Date of Patent: May 22, 2018

(54) CUP HOLDER FOR CARRYING OUT A HEATING OR COOLING TREATMENT

(71) Applicant: NIFCO INC., Yokosuka-shi, Kanagawa (JP)

(72) Inventor: Atsushi Doi, Yokosuka (JP)

(73) Assignee: NIFCO INC., Yokosuka-shi, Kanagawa (JP)

( * ) Notice: Subject to any disclaimer, the term of this patent is extended or adjusted under 35 U.S.C. 154(b) by 142 days.

(21) Appl. No.: 15/022,262

(22) PCT Filed: Sep. 3, 2014

(86) PCT No.: PCT/JP2014/073263
§ 371 (c)(1),
(2) Date: Mar. 16, 2016

(87) PCT Pub. No.: WO2015/041058
PCT Pub. Date: Mar. 26, 2015

(65) Prior Publication Data
US 2016/0236605 A1    Aug. 18, 2016

(30) Foreign Application Priority Data

Sep. 19, 2013  (JP) .................................. 2013-194475

(51) Int. Cl.
*F25B 21/02*  (2006.01)
*B60N 3/10*  (2006.01)
*F25B 21/04*  (2006.01)

(52) U.S. Cl.
CPC ............. *B60N 3/104* (2013.01); *B60N 3/101* (2013.01); *B60N 3/106* (2013.01); *F25B 21/04* (2013.01);
(Continued)

(58) Field of Classification Search
CPC ......... B60N 3/104; B60N 3/101; F25B 21/04; F25B 2321/0212; F25B 2700/2104; F25B 2321/023; F25B 2321/0251
(Continued)

(56) References Cited

U.S. PATENT DOCUMENTS 4,980,673 A * 12/1990 Kleven ................... G08B 19/02
  244/134 F
5,842,353 A * 12/1998 Kuo-Liang ........ A47G 19/2288
  219/419
(Continued)

FOREIGN PATENT DOCUMENTS

| DE | 102011088015 A1 | 6/2013 |
| JP | 2005-254854 A | 9/2005 |
| JP | 2009-248869 A | 10/2009 |
| WO | 2007/089789 A2 | 8/2007 |

OTHER PUBLICATIONS

Korea Patent Office, "Office Action for Korean Patent Application No. 10-2014-7035103," dated Dec. 11, 2015.
(Continued)

*Primary Examiner* — Frantz Jules
*Assistant Examiner* — Steve Tanenbaum
(74) *Attorney, Agent, or Firm* — Manabu Kanesaka (57) ABSTRACT

A cup holder is provided, in which a control portion calculates a container-housing-portion temperature gradient ΔT based on a temperature T detected by a thermistor disposed inside a convex portion located on a bottom portion of a container housing portion. The control portion automatically carries out heating or cooling relative to the container housing portion based on that the container-housing-portion temperature gradient ΔT is a heating reference temperature gradient α or above, or is a cooling reference temperature gradient β or below. Thus, determinations of the heating or cooling is carried out based on only the container-housing-
(Continued)

portion temperature gradient ΔT, so that heating or cooling control can be accurately carried out only by one temperature sensor.

10 Claims, 8 Drawing Sheets

(52) U.S. Cl.
    CPC . *F25B 2321/023* (2013.01); *F25B 2321/0212* (2013.01); *F25B 2321/0251* (2013.01); *F25B 2700/2104* (2013.01)

(58) Field of Classification Search
    USPC .......................................................... 62/3.3
    See application file for complete search history.

(56) References Cited

U.S. PATENT DOCUMENTS

| | | |
|---|---|---|
| 8,438,863 B2 | 5/2013 | Lofy |
| 2007/0204629 A1* | 9/2007 | Lofy ...................... B60N 3/104 62/3.61 |
| 2009/0288800 A1 | 11/2009 | Kang et al. |

OTHER PUBLICATIONS

PCT International Search Report of PCT/JP2014/073263.
Europe Patent Office, "Search Report for European Patent Application No. 14846412.6," dated May 4, 2017.

* cited by examiner

CUP HOLDER FOR CARRYING OUT A HEATING OR COOLING TREATMENT

RELATED APPLICATIONS

The present application is National Phase of International Application No. PCT/JP2014/073263 filed Sep. 3, 2014, and claims priority from Japanese Application No. 2013-194475, filed Sep. 19, 2013, the disclosure of which is hereby incorporated by reference herein in its entirety.

FIELD OF TECHNOLOGY

The present invention relates to a cup holder which heats or cools a housed container.

BACKGROUND ART

For a floor console for an automobile, there is provided a cup holder housing a beverage container. Among cup holders, there is a type which can heat or cool the housed container.

This type of cup holder has a structure wherein, for example, a user selects heating or cooling the beverage container inside the cup holder by a switch operation, and based on a selection thereof, current is applied to a Peltier element disposed on a lower portion of the holder to heat or cool the beverage container inside the cup holder.

However, it is troublesome that heating or cooling of the beverage container is not carried out unless the switch operation is carried out after housing the beverage container in the cup holder, so that a cup holder which automatically heats or cools is in demand.

As for such a cup holder, for example, Japanese Unexamined Patent Application Publication No. 2009-238869 discloses a structure comprising a temperature sensor which can measure a container temperature, and a temperature sensor which can measure an outside temperature, and in a case wherein the container temperature is a heating reference temperature or above, or is a cooling reference temperature or below, the housed container is heated or cooled. In a case wherein the container temperature is the heating reference temperature or below, and is the cooling reference temperature or above, if the container temperature is the outside temperature or above, the housed container is heated, and if the container temperature is below the outside temperature, the container is cooled. Due to the aforementioned structure, even if a user does not select heating or cooling the housed container by the switch operation, the heating or cooling is automatically selected so as to carry out appropriate heat retention or cool retention.

SUMMARY OF THE INVENTION

Problems to be Solved by the Invention

In a technical idea described in the Patent Document 1, however, there is a problem that two temperature sensors are required in order to measure the container temperature and the outside temperature so as to increase the number of sensors.

Also, there is a problem that because of outside temperature variations, a determination criterion of the heating or cooling might vary as well.

The present invention is made in view of the aforementioned facts, and an object of the present invention is to provide a cup holder which can decrease the number of the sensors, and automatically heat or cool accurately.

Means for Solving the Problems

The first aspect of the present invention is to provide a cup holder comprising a container housing portion internally housing a container; a thermoelectric element heating or cooling the container housed in the container housing portion by applying current; a temperature measurement device measuring a temperature of the container housing portion; and a control portion calculating a container-housing-portion temperature gradient per unit time based on the temperature of the container housing portion detected by the temperature measurement device, and controlling the thermoelectric element based on a comparison between the container-housing-portion temperature gradient and a reference temperature gradient.

In the aforementioned aspect, the temperature of the container housing portion varies based on a temperature difference between a housed beverage container and the container housing portion. The temperature of the container housing portion is detected by the temperature measurement device to calculate the container-housing-portion temperature gradient per unit time in the control portion. Based on the comparison between the container-housing-portion temperature gradient and the reference temperature gradient, the thermoelectric element is controlled.

Thus, in the cup holder of the present invention, the control portion determines heating or cooling based on a contrast between the container-housing-portion temperature gradient and a reference temperature gradient only by detecting the temperature of the container housing portion in a temperature detection device. Namely, an automatic control of the heating or cooling of the cup holder can be carried out only by one temperature detection device. Also, the control portion controls based on only a temperature gradient of the container housing portion, so that regardless of an outside temperature, an accurate automatic control can be carried out.

As for a second aspect of the present invention, in the first aspect of the present invention, the cup holder is provided, in which the control portion stores a heating reference temperature gradient which becomes a determination criterion of applying current for heating the thermoelectric element in the reference temperature gradient, and in a case wherein the container-housing-portion temperature gradient is the heating reference temperature gradient or above, the current is applied to the thermoelectric element to heat the container housed in the container housing portion.

In the aforementioned aspect, the temperature of the container housing portion is merely detected by the temperature detection device, so that the control portion calculates the container-housing-portion temperature gradient, and in a case wherein the container-housing-portion temperature gradient is the heating reference temperature gradient or above, the current is applied to the thermoelectric element to heat the container housed in the container housing portion.

Thus, the heating of the cup holder can be automatically controlled only by one temperature detection device. Namely, the accurate automatic control can be carried out by a simple structure.

As for a third aspect of the present invention, in the first or second aspect of the present invention, the cup holder is provided, in which the control portion stores a cooling reference temperature gradient which becomes a determination criterion of applying current for cooling the thermoelectric element in the reference temperature gradient, and in a case wherein the container-housing-portion temperature gradient is the cooling reference temperature gradient or below, the current is applied to the thermoelectric element to cool the container housed in the container housing portion.

In the aforementioned aspect, the temperature of the container housing portion is merely detected by the temperature detection device, so that the control portion calculates the container-housing-portion temperature gradient, and in a case wherein the container-housing-portion temperature gradient is the cooling reference temperature gradient or below, the current is applied to the thermoelectric element to cool the container housed in the container housing portion.

Thus, the cooling of the cup holder can be automatically controlled only by one temperature detection device. Namely, an accurate control can be carried out by the simple structure.

As for a fourth aspect of the present invention, in the third aspect of the present invention citing the second aspect of the present invention, the cup holder is provided, in which in a case wherein the container-housing-portion temperature gradient is smaller than the heating reference temperature gradient, and is larger than the cooling reference temperature gradient, the current is not applied to the thermoelectric element.

In the aforementioned aspect, in the case wherein the temperature gradient of the container housing portion is smaller than the heating reference temperature gradient, and is larger than the cooling reference temperature gradient, the current is not applied to the thermoelectric element. Namely, in a case wherein the container-housing-portion temperature gradient is small, the cup holder neither heats nor cools the container housed in the container housing portion.

Thereby, even in a case wherein a user desires to hold a current temperature, the cup holder can prevent the container from heating or cooling, and can prevent malfunctions of heating or cooling the container according to a minute temperature change inside a vehicle interior.

As for a fifth aspect of the present invention, in any one aspect of the first to fourth aspects of the present invention, the cup holder is provided, in which the temperature measurement device is embedded in the container housing portion.

In the aforementioned aspect, since the temperature measurement device is embedded in the container housing portion, the temperature measurement device is not visually recognized from an outside so as to excel in design.

As for a sixth aspect of the present invention, in any one aspect of the first to fifth aspects of the present invention, the cup holder is provided, in which the thermoelectric element is a Peltier element.

In the aforementioned aspect, since the thermoelectric element is the Peltier element, a setup can be easily carried out.

Effect of the Invention

The cup holder of the present invention can automatically control the heating or cooling of the container accurately with the simple structure.

BEST MODES OF CARRYING OUT THE INVENTION

Figure 1:
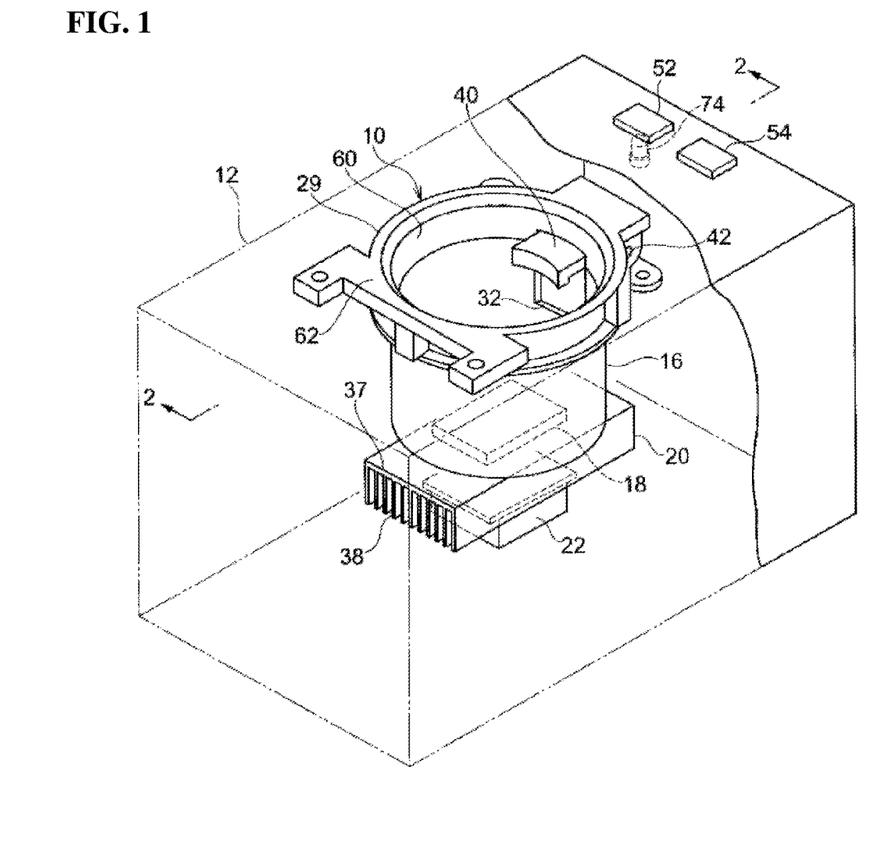
FIG. 1 is an overall perspective view of a cup holder according to one embodiment of the present invention.
Figure 2:
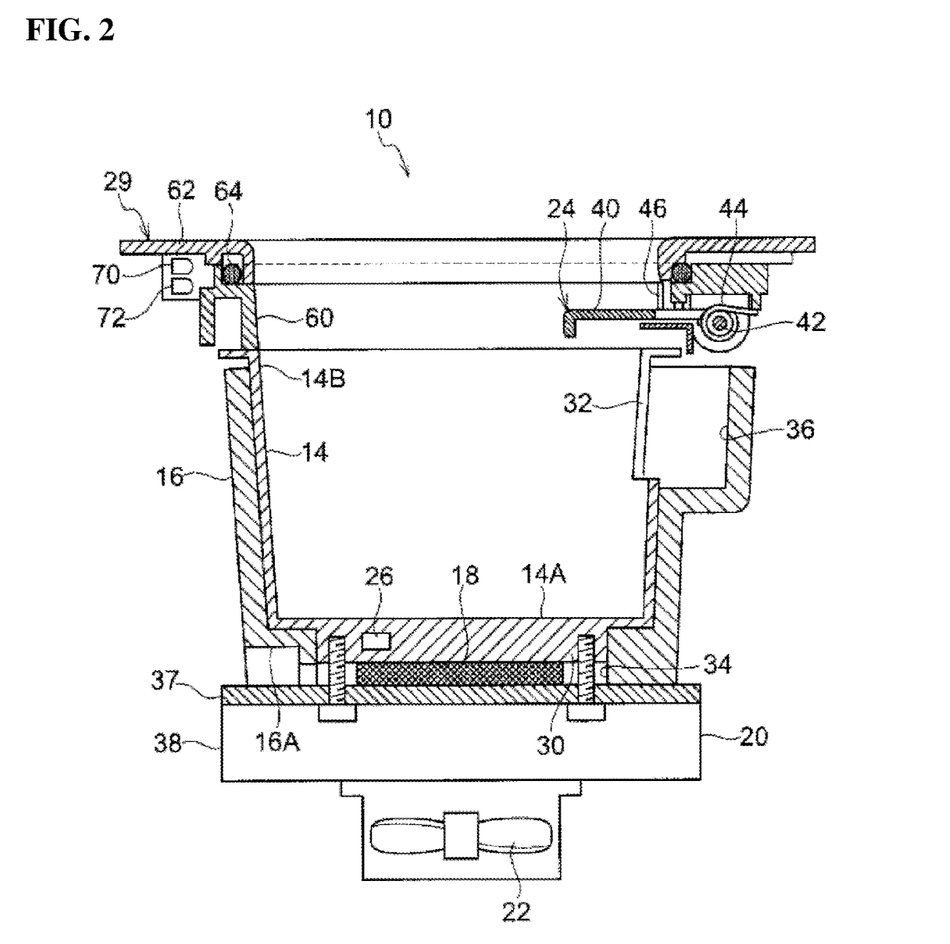
FIG. 2 is a cross-sectional view taken along a line 2-2 in FIG. 1.
Figure 3:
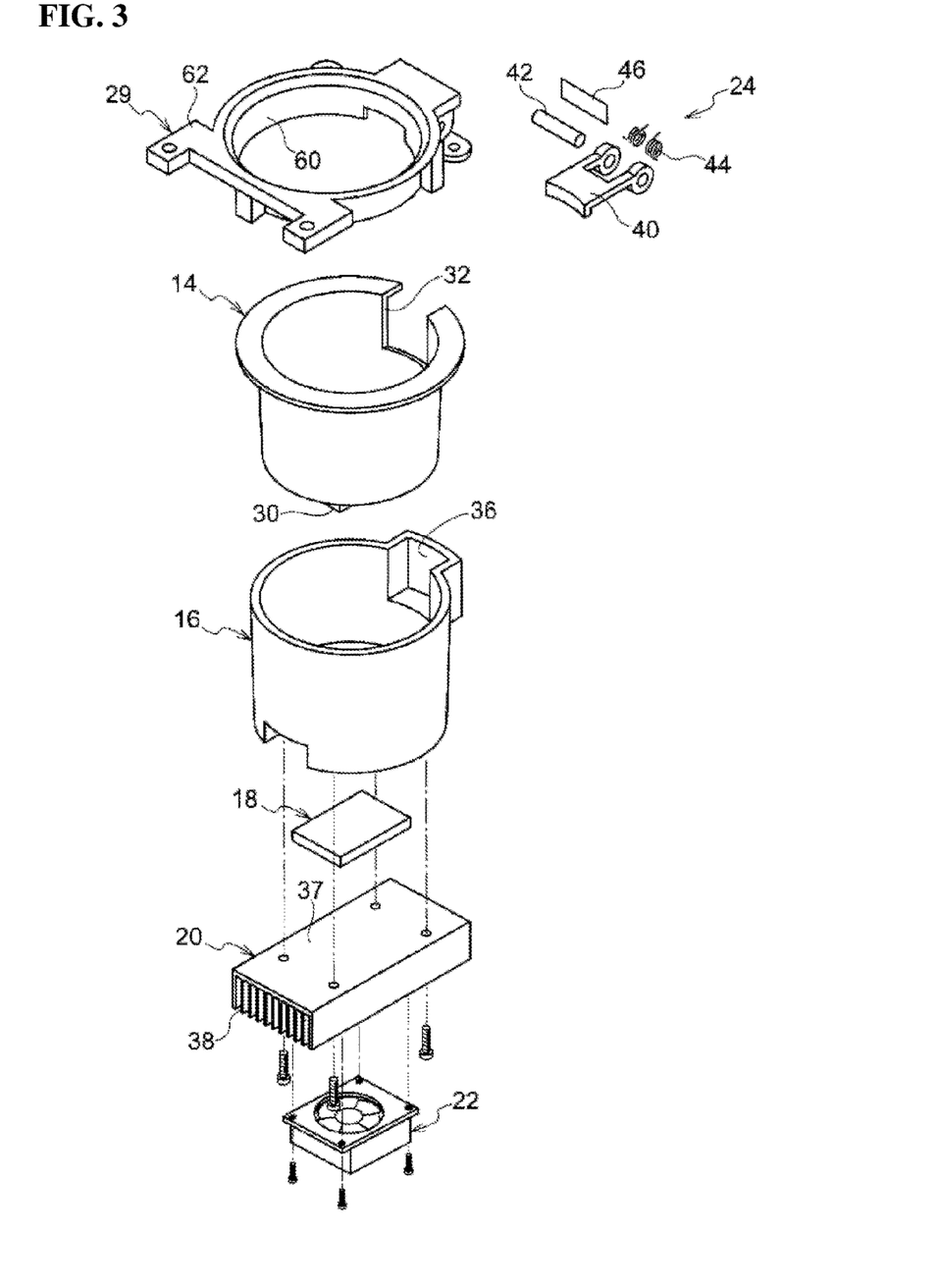
FIG. 3 is an exploded perspective view of the cup holder according to one embodiment of the present invention.
Figure 4:
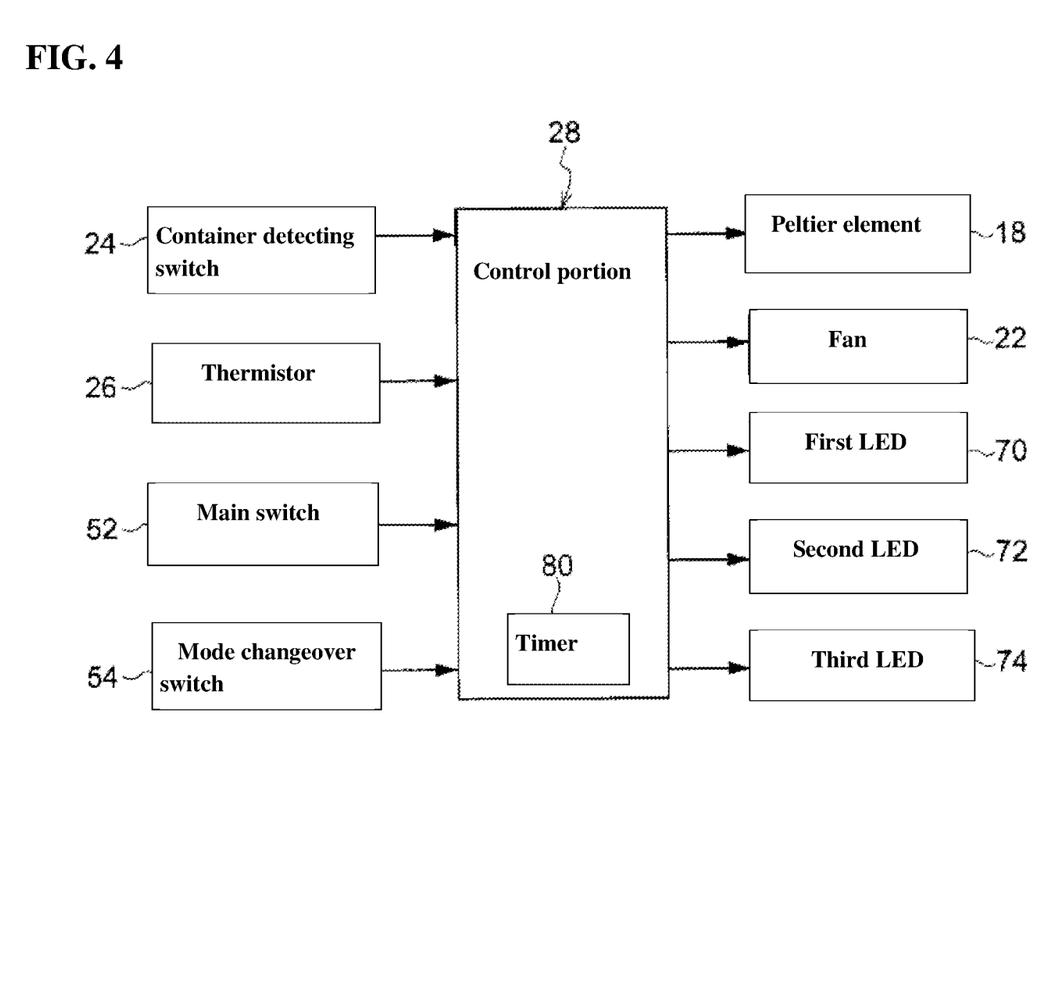
FIG. 4 is a block diagram showing a structure of the cup holder according to one embodiment of the present invention.

Next, one embodiment of a cup holder of the present invention will be explained according to FIGS. 1 to 8. FIG. 1 is an overall perspective view of the cup holder; FIG. 2 is a cross-sectional view of the cup holder taken along a line 2-2 in FIG. 1; FIG. 3 is an exploded perspective view of the cup holder; and FIG. 4 is a block diagram showing a structure of the cup holder.

In the present embodiment, as shown in FIG. 1, a cup holder 10 is disposed in a floor console 12 for an automobile.

As shown in FIG. 1 to FIG. 4, the cup holder 10 basically comprises a container housing portion 14 having a cup shape in which a beverage container is housed; an insulator 16 which is a heat insulating material housing the container housing portion 14; a Peltier element 18 abutting against a bottom face of the container housing portion 14 to heat or cool the container housing portion 14; a heat sink 20 disposed on a bottom face side of the Peltier element 18; a fan 22 for promoting a heat exchange of a heat sink 20; a container detecting switch 24 detecting the housing of the beverage container relative to the container housing portion 14; a thermistor 26 which is a temperature measurement device detecting a temperature of the container housing portion 14; a control portion 28; and a lid body 29 attached to an upper portion of the container housing portion 14.

The container housing portion 14 has approximately the cup shape for housing the beverage container, and is made of aluminum having a high thermal conductivity. Also, as shown in FIG. 2 and FIG. 3, on a bottom face 14A of the container housing portion 14, there is formed a convex portion 30 having a rectangular shape for abutting against the Peltier element 18. Also, as shown in FIG. 3, on an upper edge portion of the container housing portion 14, there is formed a concave portion having a rectangular shape at one portion in a circumferential direction.

As shown in FIG. 2 and FIG. 3, the insulator 16 has approximately a cup shape which can house the container housing portion 14, and is formed by an EPS (polystyrene foam). Also, as shown in FIG. 2, on a bottom face 16A of the insulator 16, there is formed a hole portion 34 having a rectangular shape formed such that the convex portion 30 of the container housing portion 14 and the Peltier element 18 can enter.

Therefore, when the container housing portion 14 is housed in the insulator 16, the container housing portion 14 abuts against the bottom face 16A to be supported, and the convex portion 30 of the container housing portion 14 is inserted into the hole portion 34 (see FIG. 2).

Also, on an upper portion of the insulator 16, there is formed a concave portion 36 projecting to an outside in a radial direction for housing the later-described flap 40 of the container detecting switch 24 at a time of housing the beverage container. Incidentally, the concave portion 32 of the container housing portion 14 and the concave portion 36 of the insulator 16 are positioned purposely and assembled, so that the flap 40 of the container detecting switch 24 can enter the concave portion 36 (see FIG. 1 and FIG. 3).

The Peltier element 18 has approximately a rectangular shape wherein the insulator 16 is disposed on the heat sink 20 so as to enter into the hole portion 34 of the insulator 16, and be clamped between the convex portion 30 of the container housing portion 14 and the heat sink 20 (see FIG. 2). As is well known, the Peltier element 18 switches a current-carrying direction so as to allow a container housing portion 14 (convex portion 30) side to be a heat release side, or to be a heat absorption side. Namely, the Peltier element 18 has a structure which can heat or cool the beverage housing portion 14 by switching the current-carrying direction. Incidentally, the Peltier element 18 corresponds to a thermoelectric element of the present invention.

In the heat sink 20, there are formed a flat face portion 37 having a rectangular shape abutting against the Peltier element 18; and a plurality of fins 38 extending along a longitudinal direction on a lower face of the flat face portion 37 in parallel at predetermined intervals.

On a lower side of the heat sink 20, there is disposed the fan 22 having a structure of sucking a heat on a heat sink 20 side to the outside by driving of the fan 22.

As shown in FIG. 1 to FIG. 3, the container detecting switch 24 is provided on a lower side of the lid body 29 at a position corresponding to the concave portion 36 of the insulator 16. The container detecting switch 24 includes the flap 40 having approximately a rectangular shape, and is freely rotatable around a shaft body 42. Also, the flap 40 is always urged upward by torsional springs 44 provided in the shaft body 42. Therefore, in a state wherein the beverage container is not housed in the container housing portion 14, the flap 40 abuts against a contact point 46 provided on an upper side to be in a state of horizontally protruding to an inside of the container housing portion 14. On the other hand, in a state wherein the beverage container is entered, the flap 40 is pressed down by the beverage container against an urging force of the torsional springs 44 to enter into the concave portion 36 of the insulator 16. The flap 40 abuts against the contact point 46, so that the contact point 46 becomes a conductive state, and a detection signal is sent to the control portion 28.

As shown in FIG. 2, the thermistor 26 is disposed inside the convex portion 30 provided in the bottom face 14A of the container housing portion 14. The thermistor 26 detects a temperature T of the container housing portion 14, and outputs the temperature T to the control portion 28. Incidentally, the thermistor 26 corresponds to the temperature measurement device of the present invention.

As shown in FIG. 4, the control portion 28 controls the Peltier element 18; the fan 22; and the later-described first to third LEDs 70, 72, and 74 based on the later-described main switch 52 and mode changeover switch 54, the container detecting switch 24, and an input signal from the thermistor 26. Also, in the control portion 28, there are set a heating reference temperature gradient $\alpha$ and a cooling reference temperature gradient $\beta$ as reference temperature gradients carrying out heating or cooling treatment controls; and a target heating temperature T1, a target cooling temperature T2, a re-heating reference temperature T3, and a re-cooling reference temperature T4 as reference temperatures carrying out heat-retention and cold-retention controls. Incidentally, the heating reference temperature gradient $\alpha$ is higher than the cooling reference temperature gradient $\beta$.

The heating reference temperature gradient $\alpha$ is the reference temperature gradient for determining the heating of the beverage container by comparing to a container-housing-portion temperature gradient $\Delta T$ which is a temperature gradient of the temperature T of the container housing portion 14 detected by the thermistor 26. Similarly, the cooling reference temperature gradient $\beta$ is the reference temperature gradient for determining the cooling of the beverage container.

Also, the target heating temperature T1 is a determination reference temperature for halting the heating at the heating time. The reheating reference temperature T3 is the reference temperature for determining that the re-heating is necessary in order for the beverage container to hold a heating state (heat retention) in the cup holder 10 wherein the heating has halted.

Similarly, the target cooling temperature T2 is the determination reference temperature for halting the cooling at the cooling time. The re-cooling reference temperature T4 is the reference temperature for determining that the re-cooling is necessary in order for the beverage container to hold a cooling state (cold retention) in the cup holder 10 wherein the cooling has halted.

Moreover, as shown in FIG. 4, in the control portion 28, there is provided a timer 80. The control portion 28 is used for measuring the temperature T of the container housing portion 14 at intervals of a predetermined time from a time when the container housing portion 14 starts to be heated or cooled based on a count value of the timer 80; measuring an elapsed time t for maintaining the heating or cooling state after the beverage container is pulled out from the container housing portion 14; or the like.

As shown in FIG. 1 and FIG. 2, the lid body 29 is attached to an upper portion of the container housing portion in order to be attached to an upper face of the floor console 12. The lid body 29 comprises an opening portion 60 having a cylindrical shape with a diameter equal to that of the opening portion 14B of the container housing portion 14; and an attachment portion 62 extending in a horizontal direction from an upper side end portion of the opening portion 60. On a lower side of the attachment portion 62, there is surrounded a light guiding tube 64 along an outer periphery of the opening portion 60. The attachment portion 62 is made of resin of a semitransparent member, so that a lighting state of the light guiding tube 64 can be visually recognized from the outside.

The light guiding tube 64 is connected to a first LED 70 and a second LED 72, and at a heating treatment time, the first LED 70 lights so as to light a red color, at a cooling treatment time, the second LED 72 lights so as to light a blue color, and a red color or blue color ring is visually recognized on a surface of the attachment portion 62.

Incidentally, on the floor console 12, there are provided the main switch 52 and the mode changeover switch 54 of the cup holder 10. The main switch 52 is a switch switching power sources of the cup holder 10 ON and OFF, and the mode changeover switch 54 is a switch switching the heating or cooling treatment. Changeover signals of both switches 52 and 54 have a structure of being entered into the control portion 28. Incidentally, on a reverse side of the main switch 52, there is disposed a third LED 74, and in a case wherein the main switch 52 turns ON, the third LED 74 lights, so that a user can visually recognize the main switch ON (the lighting of the third LED 74) through a semitransparent resin of the main switch 52.

An operation (control) of the cup holder 10 formed in the above-mentioned manner will be explained.

Figure 5:
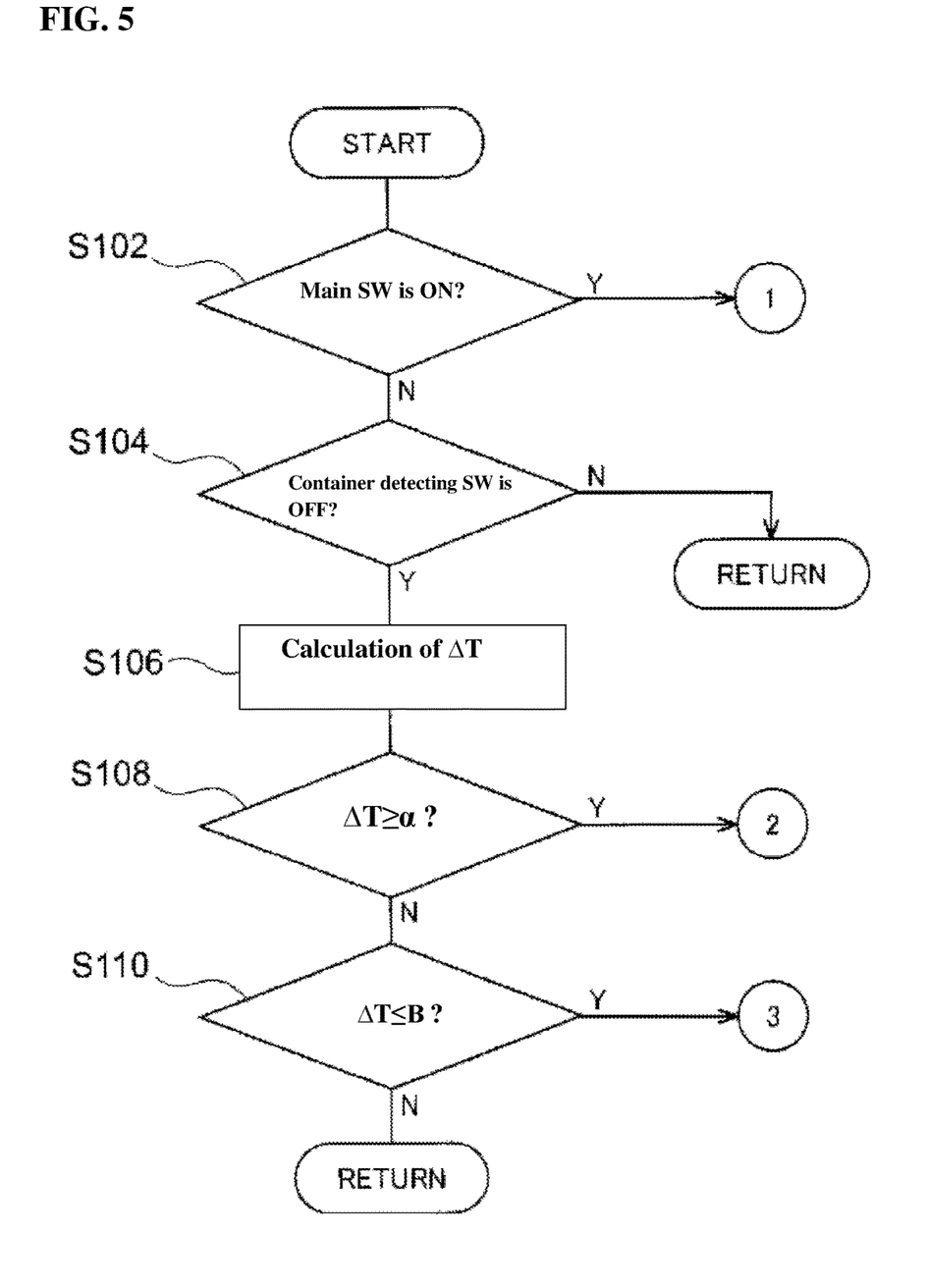
FIG. 5 is a main flowchart showing a heating and cooling control of the cup holder according to one embodiment of the present invention.

As shown in FIG. 5, the control portion 28 of the cup holder 10 determines whether or not the main switch 52 is ON in a state wherein an ACC power source of the automobile is ON (S102). If the main switch 52 is ON (Y in S102), the control portion 28 determines that a manual mode is selected by a user so as to carry out the control of the manual mode shown in FIG. 6.

Figure 6:
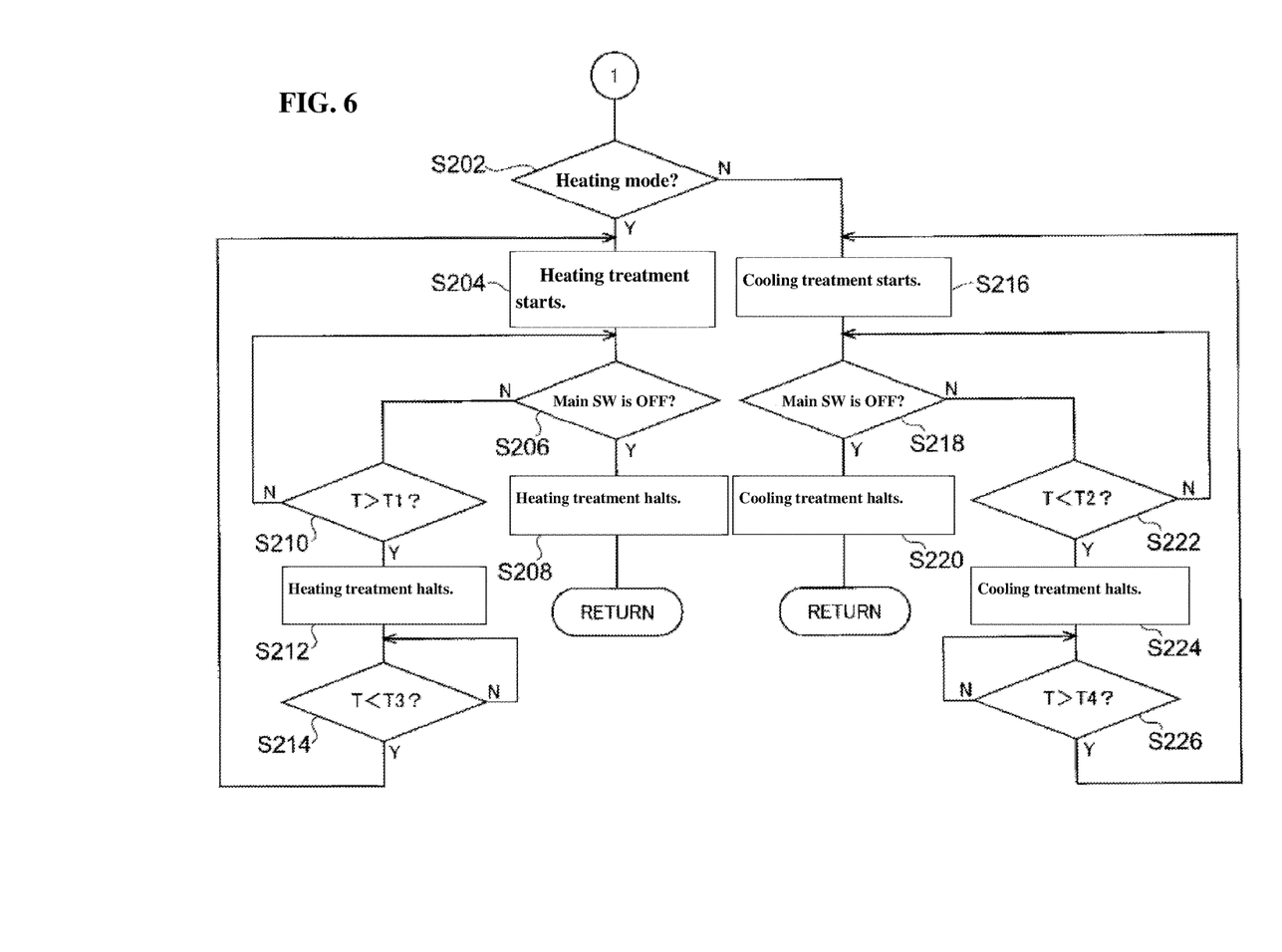
FIG. 6 is a flowchart showing a manual mode according to one embodiment of the present invention.

Namely, the control portion 28 determines whether or not a heating mode is selected in the mode changeover switch 54 (S202). If the heating mode is selected (Y in S202), the control portion 28 starts the heating treatment (S204). Specifically, current is applied to the Peltier element 18. Thereby, the container housing portion 14 is heated, and the housed beverage container is heated. Also, the first LED 70 is turned to light, so that the light guiding tube 64 lights in the red color, and the red color ring can be visually recognized on a surface of the lid body 29 (hereinafter, regarding the similar treatment, it will be merely described that "the heating treatment starts"). Also, the control portion 28 determines whether or not the main switch 52 is OFF (S206).

In a case wherein the main switch 52 is OFF, it can be considered as a user's intention so as to halt the heating treatment (S208). Specifically, the current applied to the Peltier element 18 halts. On the other hand, the first LED 70 maintains the lighting because of a lingering heat display until the temperature T of the container housing portion 14 becomes an extinguishing set temperature after the current applied to the Peltier element 18 halts, and when the temperature T of the container housing portion 14 reaches the extinguishing set temperature, the first LED 70 is extinguished. Thereby, the red color ring visually recognized from the surface of the lid body 29 by the light guiding tube 64 disappears (hereinafter, regarding the similar treatment, it will be merely described that "the heating treatment halts").

On the other hand, in a case wherein the main switch 52 remains ON (N in the S206), the temperature T of the container housing portion 14 is detected by the thermistor 26, and the heating continues until the temperature T reaches the target heating temperature T1 (N in S210).

When the temperature T of the container housing portion 14 reaches the target heating temperature T1 (Y in the S210), the control portion 28 is transferred from the heating treatment to a heat-retention treatment. Namely, when the temperature T of the container housing portion 14 reaches the target heating temperature T1, the heating treatment is halted (S212). If the temperature T of the container housing portion 14 becomes lower than the re-heating reference temperature T3, the heating treatment restarts (Y in S214→S204). Thus, the temperature T of the container housing portion 14 is controlled inside a predetermined temperature range (T3<T<T1), and the control portion 28 carries out the heat-retention treatment until the main switch 52 is turned OFF.

In a case wherein the mode changeover switch 54 has selected a cooling mode in the step S202 (N in the S202), the cooling treatment starts (S216). Specifically, the current is applied to the Peltier element 18 so as to cool the container housing portion 14 to cool the beverage container which has been housed in the container housing portion 14, and actuates the fan 22. Moreover, the second LED 72 is actuated to light, so that the light guiding tube 64 lights in the blue color, and the blue color ring becomes visually recognizable from the surface of the lid body 29 (hereinafter, regarding the similar treatment, it will be merely described that "the cooling treatment starts"). Also, the control portion 28 determines whether or not the main switch 52 is OFF (S218).

In a case wherein the main switch 52 is OFF, it can be considered that a user desires no further cooling so as to halt the cooling treatment (S220). Specifically, the current applied to the Peltier element 18 halts, and the operation of the fan 22 halts as well. Moreover, the second LED 72 is extinguished as well. Thereby, the blue color ring visually recognized from the surface of the lid body 29 by the light guiding tube 64 disappears (hereinafter, regarding the similar treatment, it will be merely described that "the cooling treatment halts").

On the other hand, in a case wherein the main switch 52 remains ON (N in the S218), the temperature T of the container housing portion 14 is detected by the thermistor 26, and the cooling treatment continues until the temperature T reaches the target cooling temperature T2 (N in S222→S218).

When the temperature T of the container housing portion 14 reaches the target cooling temperature T2 (Y in the S222), the control portion 28 is transferred from the cooling treatment to a cold-retention treatment. Namely, when the temperature T of the container housing portion 14 reaches the target cooling temperature T2, the cooling treatment is halted (S224). Due to a halt of the cooling treatment, if the temperature T of the container housing portion 14 exceeds the re-cooling reference temperature T4, the cooling treatment restarts (Y in S226→S216). Thus, the temperature T of the container housing portion 14 is controlled inside the predetermined temperature range (T2<T<T4), and the control portion 28 carries out the cold retention until the main switch 52 is turned OFF.

Next, in a case wherein the main switch 52 is determined to be OFF in the step S102 shown in FIG. 5, the control portion subsequently determines whether or not the container detecting switch 24 is OFF (S104).

In a case wherein the container detecting switch 24 is ON, namely, the beverage container is not housed in the container housing portion 14, there is no need for carrying out the later-described automatic control so as to return to the step S102 again (N in the S104).

On the other hand, in a case wherein the container detecting switch 24 is detected to be OFF (Y in S104), namely, in a case wherein the beverage container is housed in the container housing portion 14, the control portion 28 comes to an automatic control mode. Specifically, the control portion 28 calculates the temperature gradient (hereinafter, there is a case of being called the container-housing-portion temperature gradient) $\Delta T$ of the temperature T of the container housing portion 14 per unit time based on the temperature T of the container housing portion 14 entered from the thermistor 26 at the intervals of the predetermined time (S106).

Subsequently, in the control portion 28, whether or not the container-housing-portion temperature gradient $\Delta T$ is the heating reference temperature gradient $\alpha$ or above is determined (S108). In a case wherein the container-housing-portion temperature gradient $\Delta T$ is the heating reference temperature gradient $\alpha$ or above (Y in S108), since the beverage container of a warm beverage is housed in the container housing portion 14, the control portion 28 determines that the temperature T of the container housing portion 14 is increased so as to start the heating treatment shown in FIG. 7 (S302).

Figure 7:
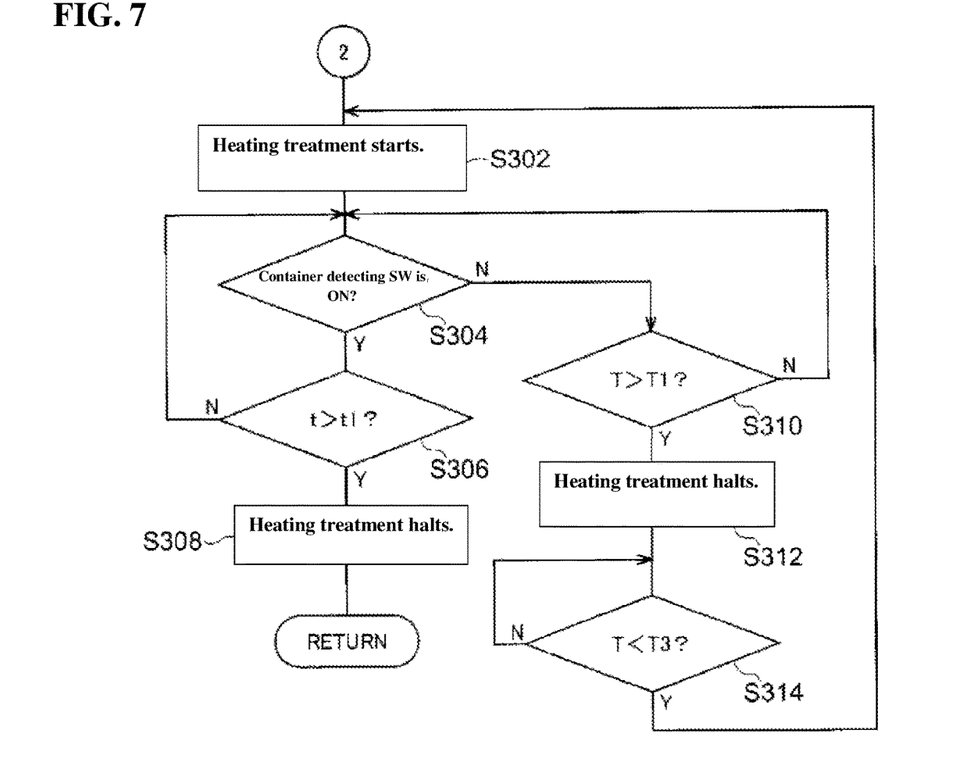
FIG. 7 is a flowchart showing a heating treatment in an automatic control mode according to one embodiment of the present invention.

Next, after the heating treatment starts, whether or not the container detecting switch 24 turns ON at the intervals of the predetermined time is determined (S304). In a case wherein the container detecting switch 24 turns ON (Y in S304), the control portion 28 continues the heating treatment until the elapsed time t from timing when the container detecting switch 24 turns ON passes a standby time t1 (N in S306). Namely, even in a case wherein the beverage container is pulled out from the container housing portion 14, there is a possibility that the beverage container is returned to the container housing portion 14 within the standby time t1, so that the heating treatment continues for the heat retention of the container housing portion 14 in the meantime.

In a case wherein the container detecting switch 24 does not turn OFF within the standby time t1 (Y in S306), the control portion 28 determines that there is no possibility that a user returns the beverage container to the cup holder 10 so as to halt the heating treatment (S308).

On the other hand, in a case wherein the container detecting switch 24 has been OFF (N in the S304), namely, in a case wherein the beverage container has been continuously housed in the container housing portion 14 throughout, or in a case wherein although the beverage container has been taken out once, the beverage container is returned to the container housing portion 14 within the standby time t1, whether or not the temperature T of the container housing portion 14 becomes the target heating temperature T1 or above is determined (S310).

Here, in a case wherein the temperature T of the container housing portion 14 has not reached the target heating temperature T1, the heating treatment continues (N in the S310→S304).

In a case wherein the temperature T of the container housing portion 14 reaches the target heating temperature T1, the heating treatment halts, and the heat-retention treatment starts (S312).

Hereinafter, whether or not the temperature T of the container housing portion 14 becomes lower than the reheating reference temperature T3 is determined (S314). If the temperature T is the reheating reference temperature T3 or above, a heating treatment halted state is maintained (N in the S314), and if the temperature T comes under the reheating reference temperature T3, the heating treatment after the step S302 restarts (Y in the S314). Thus, until the beverage container is pulled out from the container housing portion 14, and the standby time t1 passes, the heat retention of the beverage container heated inside the cup holder 10 is carried out.

On the other hand, in the step S108 shown in FIG. 5, in a case wherein the container-housing-portion temperature gradient ΔT is below the heating reference temperature gradient α (N in the S108), whether or not the container-housing-portion temperature gradient ΔT is below the cooling reference temperature gradient β is determined (S110).

Figure 8:
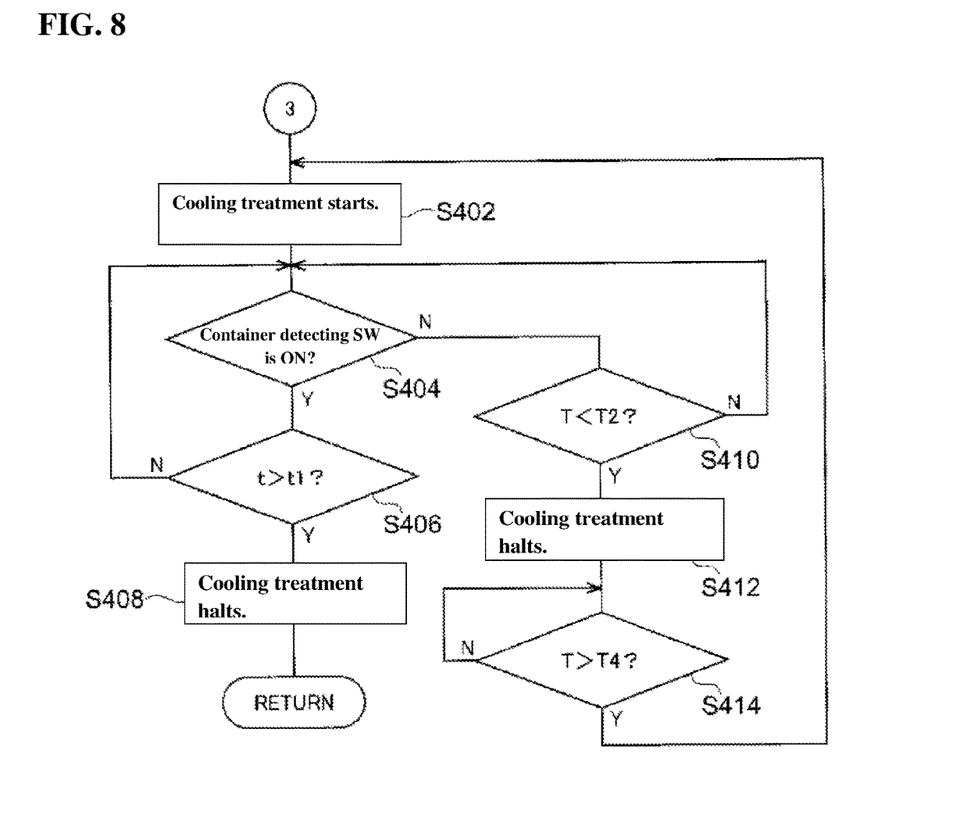
FIG. 8 is a flowchart showing a cooling treatment in the automatic control mode according to one embodiment of the present invention.

In a case wherein the container-housing-portion temperature gradient ΔT is the cooling reference temperature gradient β or below (Y in the S110), since a cold beverage container is housed in the container housing portion 14, the control portion 28 determines that the temperature T of the container housing portion 14 is decreased, so as to start the cooling treatment shown in FIG. 8 (S402).

Next, after the cooling treatment starts, whether or not the container detecting switch 24 turns ON is determined (S404). In a case wherein the container detecting switch 24 turns ON (Y in S404), the control portion 28 continues the cooling treatment until the elapsed time t from the timing when the container detecting switch 24 turns ON passes the standby time t1 (N in S406). Namely, even in a case wherein the beverage container is pulled out from the container housing portion 14, there is a possibility that the beverage container is returned within the standby time t1, so that the cooling treatment continues in the meantime so as not to increase the temperature of the container housing portion 14.

In a case wherein the container detecting switch 24 does not turn OFF within the standby time t1 (Y in the S406), the control portion 28 determines that there is no possibility to return the beverage container to the cup holder 10 so as to halt the cooling treatment (S408).

On the other hand, in a case wherein the container detecting switch 24 has been OFF (N in the S404), namely, in a case wherein the beverage container remain in the container housing portion 14 throughout, or in a case wherein although the beverage container has been taken out once, the beverage container is returned to the container housing portion 14 within the standby time t1, whether or not the temperature T of the container housing portion 14 becomes below the target cooling temperature T2 is determined (S410).

Here, in a case wherein the temperature T of the container housing portion 14 has not reached the target cooling temperature T2 (N in the s410), the treatment after the step S404 is repeated.

In a case wherein the temperature T of the container housing portion 14 reaches the target cooling temperature T2 (Y in S410), the cooling treatment halts, and the cold-retention treatment starts (S412).

Hereinafter, whether or not the temperature T of the container housing portion 14 is increased more than the re-cooling reference temperature T4 is determined (S414). If the temperature T is the re-cooling reference temperature T4 or lower, a cooling halted state is maintained (N in S414), and if the temperature T exceeds the re-cooling reference temperature T4, the cooling treatment after the step S402 restarts (Y in the S414→S402). Thus, until the beverage container is pulled out from the container housing portion 14, and the standby time t1 passes, the cold retention of the beverage container cooled inside the cup holder 10 is carried out.

On the other hand, in the step S110 in FIG. 5, in a case wherein the container-housing-portion temperature gradient ΔT is not the cooling reference temperature gradient β or below, namely, in a case wherein the container-housing-portion temperature gradient ΔT is larger than the cooling reference temperature gradient β, and is smaller than the heating reference temperature gradient α, neither heating or cooling treatment is carried out (N in the S110). This is because in a case wherein a temperature change (the container-housing-portion temperature gradient ΔT) of the container housing portion 14 is minute, it can be considered that a user desires the housing at ordinary temperature; and unintended heating or cooling (malfunctions) by a minute change of an atmospheric temperature inside a vehicle interior and the like is prevented from being carried out. In that case, any of the LEDs 70, 72, and 74 does not light, so that a user can recognize that the heating or cooling (heat retention or cold retention) treatment is not carried out manually or automatically.

However, even in a case wherein the heating or cooling treatment is carried out by the automatic control, in a case wherein the main switch 52 is turned ON, it immediately transfers to the manual mode (S202 to S226). Namely, regardless of the temperature T of the container housing portion 14 and the container-housing-portion temperature gradient ΔT, the heating treatment or the cooling treatment is carried out according to the mode selected by the mode changeover switch 54. This is for prioritizing a user's request.

Thus, in the cup holder 10 according to the present embodiment, the heating or cooling is determined based on the container-housing-portion temperature gradient ΔT calculated from the temperature T of the container housing portion 14 detected by the thermistor 26, so that the heating or cooling, and the heat retention or cold retention of the beverage container housed in the container housing portion 14 can be automatically carried out. Therefore, every time a user uses the cup holder 10, the heating or cooling treatment is automatically carried out without operating the main switch 52 or the mode changeover switch 54 so as to improve a user's usability.

Also, a determination of the heating or cooling is automatically carried out based on only the container-housing-portion temperature gradient ΔT, so that only the thermistor 26 disposed in the container housing portion 14 is required for a temperature detection device. Namely, only one temperature detection device (sensor) is required so as to realize a cost reduction.

Moreover, the determination of the heating or cooling is carried out only by the container-housing-portion temperature gradient ΔT so as to be difficult to be affected by variations of an outside temperature (the vehicle interior or an outdoor temperature), and the determination of the heating or cooling can be accurately carried out.

Furthermore, in a case wherein the container-housing-portion temperature gradient ΔT is larger than the cooling reference temperature gradient β, and is smaller than the heating reference temperature gradient α (β<ΔT<α), neither of the heating or cooling is carried out, so that in a case wherein a user desires normal temperature retention, it is possible. Also, it prevents starting the heating or cooling treatment by the malfunction due to a minute temperature change of the outdoor temperature or inside the vehicle interior.

Moreover, the thermistor 26 is embedded inside the convex portion 30 on a bottom face side of the container housing portion 14 so as not to be visually recognized from the outside, so that the cup holder 10 excels in design.

Furthermore, in the cup holder 10, at the heating treatment time, the first LED 70 lights, and at the cooling treatment time, the second LED 72 lights, so that a user can easily visually recognize that the heating treatment or the cooling treatment is carried out.

Incidentally, the present embodiment controls such that only at the heating or cooling treatment time, the first LED 70 or the second LED 72 light; however, it may be controlled such that at the heating or cooling treatment time, the first LED 70 or the second LED 72 lights, and after the temperature reaches the target heating temperature or the target cooling temperature (at heat-retention and cold-retention treatment times), the first LED 70 or the second LED 72 lights. By controlling in such a manner, a user can recognize a difference of a state.

Incidentally, the present embodiment carries out the control of the heat retention or the cold retention even in the manual mode; however, the control may be carried out such that only the heating or cooling is simply carried out, and when the temperature reaches the target heating temperature T1 and the target cooling temperature T2, the heating or cooling merely halts.

Also, as for the temperature detection device for detecting the temperature T of the container housing portion 14, the thermistor 26 is used; however, it is not limited to the above provided that it can detect the temperature.

Moreover, the container detecting switch 24 is used for detecting a container housing state relative to the container housing portion 14; however, it may be a sensor such as an optical sensor and the like. However, in light of the object of the present invention of controlling a use of the sensors, switches are preferable.

Incidentally, in the present embodiment, the beverage container (cup, can, bottle, and the like) is used for housing in the cup holder; however, provided that it is a container for heating or cooling, the container is not limited to a container for beverages.

Also, in the present embodiment, the cup holder wherein one cup holder 10 is provided in the floor console 12 has been explained; however, it can be applied to the cup holder wherein a plurality of cup holders 10 is provided as well.

What is claimed is:

1. A cup holder, comprising:
a container housing portion adapted to internally house a container;
a thermoelectric element adapted to heat or cool the container housed in the container housing portion by applying current;
a temperature measurement device measuring a temperature of the container housing portion;
a main switch switching a power source of the cup holder;
a mode changeover switch switching a heating or cooling treatment; and
a control portion controlling the thermoelectric element to carry out the heating or cooling treatment,
wherein the control portion determines a manual mode to manually carry out the heating or cooling treatment when the main switch is turned on, and determines an automatic control mode to automatically carry out the heating or cooling treatment when the main switch is turned off,
in the manual mode, the control portion controls the thermoelectric element to carry out the heating treatment when the mode changeover switch selects a heating mode, and controls the thermoelectric element to carry out the cooling treatment when the mode changeover switch selects a cooling mode, and
in the automatic control mode, the control portion calculates a container-housing-portion temperature gradient per unit time based on the temperature of the container housing portion detected by the temperature measurement device, and controls the thermoelectric element based on a comparison between the container-housing-portion temperature gradient and a reference temperature gradient as a determination criterion of applying the current for heating or cooling the thermoelectric element.

2. A cup holder according to claim 1, wherein the control portion stores a heating reference temperature gradient which becomes the determination criterion of applying the current for heating the thermoelectric element in the reference temperature gradient, and in the automatic control mode, in case the container-housing-portion temperature gradient is equal to or larger than the heating reference temperature gradient, the current is applied to the thermoelectric element adapted to heat the container housed in the container housing portion.

3. A cup holder according to claim 2, wherein the control portion stores a cooling reference temperature gradient which becomes the determination criterion of applying the current for cooling the thermoelectric element in the reference temperature gradient, and in the automatic control mode, in case the container-housing-portion temperature gradient is equal to or smaller than the cooling reference temperature gradient, the current is applied to the thermoelectric element adapted to cool the container housed in the container housing portion.

4. A cup holder according to claim 3, wherein the current is not applied to the thermoelectric element in case the container-housing-portion temperature gradient is smaller than the heating reference temperature gradient, and is larger than the cooling reference temperature gradient.

5. A cup holder according to claim 4, further comprising a container detecting switch adapted to detect whether the container is housed in the container housing portion or not,
wherein in the automatic control mode, when the container is detected in the container housing portion through the container detecting switch, and the container-housing-portion temperature gradient is equal to or larger than the heating reference temperature gradient, the control portion controls the heating treatment to continue until the temperature of the container housing portion reaches a target heating temperature, and
in the automatic control mode, when the container is detected in the container housing portion through the container detecting switch, and the container-housing-portion temperature gradient is equal to or smaller than the cooling reference temperature gradient, the control portion controls the cooling treatment to continue until the temperature of the container housing portion reaches a target cooling temperature.

6. A cup holder according to claim 5, wherein in the automatic control mode, when the container is not detected in the container housing portion after the control portion starts controlling the heating treatment, the control portion continues the heating treatment for a predetermined time, and
when the container is not detected in the container housing portion after the control portion starts controlling the cooling treatment, the control portion continues the cooling treatment for the predetermined time.

7. A cup holder according to claim 6, wherein the container detecting switch includes a shaft body, a flap rotatably arranged on the shaft body, a torsional spring attached around the shaft body, and a contact point arranged above the flap,
wherein when the flap is urged with an urging force of the torsional spring and is positioned at a horizontal position to contact the contact point, the container detecting switch detects that the container is not housed in the container housing portion, and when the flap is pressed against the urging force of the torsional spring and is positioned at a vertical position to be apart from the contact point, the container detecting switch detects that the container is housed in the container housing portion.

8. A cup holder according to claim 1, wherein the temperature measurement device is embedded in the container housing portion.

9. A cup holder according to claim 1, wherein the thermoelectric element is a Peltier element.

10. A cup holder according to claim 1, wherein in the heating mode of the manual mode, the heating treatment continues until the temperature of the container housing portion detected by the temperature measurement device reaches a target heating temperature, and
when the temperature of the container housing portion becomes lower than a re-heating reference temperature, the control portion controls a heat-retention treatment to maintain the temperature of the container housing portion between the target heating temperature and the re-heating reference temperature, and the control portion controls the heat-retention treatment until the main switch is turned off; and
in the cooling mode of the manual mode, the cooling treatment continues until the temperature of the container housing portion detected by the temperature measurement device reaches a target cooling temperature, and
when the temperature of the container housing portion becomes lower than a re-cooling reference temperature, the control portion controls a cold-retention treatment to maintain the temperature of the container housing portion between the target cooling temperature and the re-cooling reference temperature, and the control portion controls the cold-retention treatment until the main switch is turned off.

* * * * *